(12) United States Patent
Utsugi

(10) Patent No.: US 8,106,970 B2
(45) Date of Patent: Jan. 31, 2012

(54) SIGNAL PROCESSING METHOD, SIGNAL PROCESSING SYSTEM, COEFFICIENT GENERATING DEVICE, AND DIGITAL CAMERA

(75) Inventor: Akihiko Utsugi, Machida (JP)

(73) Assignee: Nikon Corporation, Tokyo (JP)

( * ) Notice: Subject to any disclaimer, the term of this patent is extended or adjusted under 35 U.S.C. 154(b) by 540 days.

(21) Appl. No.: 12/230,164

(22) Filed: Aug. 25, 2008

(65) Prior Publication Data

US 2009/0021611 A1   Jan. 22, 2009

Related U.S. Application Data

(63) Continuation of application No. PCT/JP2007/056065, filed on Mar. 23, 2007.

(30) Foreign Application Priority Data

Mar. 24, 2006 (JP) .................................. 2006-083237

(51) Int. Cl.
*H04N 5/217* (2006.01)

(52) U.S. Cl. ........ 348/241; 348/248; 348/254; 348/298; 348/683; 358/463; 382/167; 382/275

(58) Field of Classification Search .................. 348/241, 348/222.1, 248, 249, 250, 254, 297, 298, 348/671, 674, 683; 382/205, 260, 275, 167, 382/266; 358/463
See application file for complete search history.

(56) References Cited

U.S. PATENT DOCUMENTS

| | | | | |
|---|---|---|---|---|
| 5,881,182 A | * | 3/1999 | Fiete et al. | 382/275 |
| 6,757,014 B1 | * | 6/2004 | Kasahara | 348/241 |
| 7,092,016 B2 | * | 8/2006 | Morton et al. | 348/241 |
| 7,260,267 B2 | * | 8/2007 | Sugimoto | 382/266 |
| 2003/0043064 A1 | | 3/2003 | Kuwabara | |
| 2005/0068431 A1 | | 3/2005 | Mori | |
| 2005/0140795 A1 | | 6/2005 | Hisamatsu et al. | |
| 2006/0038891 A1 | * | 2/2006 | Okutomi et al. | 348/222.1 |
| 2008/0151079 A1 | * | 6/2008 | Iijima et al. | 348/241 |

FOREIGN PATENT DOCUMENTS

| | | |
|---|---|---|
| JP | A 10-313428 | 11/1998 |
| JP | A 11-69226 | 3/1999 |
| JP | A 2002-199285 | 7/2002 |
| JP | A 2003-153085 | 5/2003 |
| JP | A 2003-153088 | 5/2003 |
| JP | A 2005-94338 | 4/2005 |
| JP | A 2005-167918 | 6/2005 |

OTHER PUBLICATIONS

Jun. 1, 2010 Search Report issued in European Patent Application No. 07739506.9.

* cited by examiner

*Primary Examiner* — Tuan Ho
*Assistant Examiner* — Kent Wang
(74) *Attorney, Agent, or Firm* — Oliff & Berridge, PLC

(57) ABSTRACT

An estimated noise shape estimated to be included in the signal to be corrected is calculated based on a calibration signal including a noise correlating with the noise of the signal to be corrected so as to correct a noise of a signal to be corrected. A correction value of a noise shape is generated by attenuating an amplitude of the estimated noise shape, and the noise of the signal to be corrected is corrected by using the correction value of the noise shape thus generated.

13 Claims, 4 Drawing Sheets

SIGNAL PROCESSING METHOD, SIGNAL PROCESSING SYSTEM, COEFFICIENT GENERATING DEVICE, AND DIGITAL CAMERA

INCORPORATION BY REFERENCE

The disclosure of the following priority application is herein incorporated by reference:

Japanese Patent Application No. 2006-083237 filed Mar. 24, 2006

International Patent Application No. PCT/JP2007/056065 filed Mar. 23, 2007

BACKGROUND OF THE INVENTION

1. Field of the Invention

The present invention relates to a signal processing method, a signal processing system, a coefficient generating device, and a digital camera for correcting a noise included in a signal.

2. Description of Related Art

Generally, a FPN (Fixed Pattern Noise), vertical or horizontal streak noise, is generated on an image which is imaged with a digital camera, depending on variation in characteristics of a device that amplifies exposure-generated charge and converts it into a signal. The FPN is a noise in the same shape that is commonly generated on a plurality of images which are imaged with a same image sensor. The FPN is generated with a CCD or a CMOS image sensor. A following processing has been conventionally performed for removing an offset vertical streak FPN from an image. A calibration image is imaged with an image sensor driven in a lightproof manner. An area of a predetermined number of pixels is set for each vertical line of the calibration image. The FPN value for each vertical line is estimated from average of the pixel value in the area. An image to be corrected is imaged with the image sensor driven on exposure. Subtracting a pre-calculated FPN estimation value from the each vertical line of the image to be corrected causes the FPN to be removed from the image to be corrected. Alternatively, the FPN is estimated using OB area (an imaging area in a lightproof manner at the edge of the image sensor) as a calibration image, instead of imaging in a lightproof manner (refer to Japanese Laid Open Patent Publication No. 2003-153088).

The calculation for the FPN estimation value in conventional methods has an estimation error resulting from the influence of noise included in the calibration image other than the FPN. The sufficient number of pixels in the vertical line area for the FPN counterbalances noise other than the FPN in the vertical line area and reduces the FPN estimation error. However, the sufficient number of pixels in the vertical line area may not always be obtained due to reducing the release time lag or maintaining the speed of continuous shooting (for example about 128 pixels). In this case, the FPN estimation error is not reduced sufficiently, and a vertical streak noise is generated in a FPN-corrected image. With an conventional signal detection device, an average of the pixel value is calculated to be the FPN value in a predetermined vertical area set up in an input image. Therefore, even if the estimation value includes an estimation error, the FPN estimation value is subtracted from the input image, and such noise as the FPN estimation error may remain in a FPN-removed image.

SUMMARY OF THE INVENTION

According to a first aspect of the present invention, in a signal processing method for correcting a noise of a signal to be corrected, an estimated noise shape estimated to be included in the signal to be corrected is calculated based on a calibration signal including a noise correlating with the noise of the signal to be corrected; a correction value of a noise shape is generated by attenuating an amplitude of the estimated noise shape; and the noise of the signal to be corrected is corrected by using the correction value of the noise shape thus generated.

According to a second aspect of the present invention, in the signal processing method according to the first aspect, it is preferable that the estimated noise shape is calculated by calculating an average value of signal values within a predetermined range of the calibration signal.

According to a third aspect of the present invention, in the signal processing method according to the first or second aspect, it is preferable that the amplitude of the estimated noise shape is attenuated based on an average amplitude of a noise shape included correlatively in the signal to be corrected and the calibration signal, and information on an estimated error of the estimated noise shape.

According to a fourth aspect of the present invention, in a signal processing method for correcting a noise of a signal to be corrected, a correction value of a noise shape is generated based on a calibration signal including a noise correlating with a noise of the signal to be corrected, an average amplitude of a noise shape included correlatively in the signal to be corrected and the calibration signal, and information on an estimation error of an estimated noise shape estimated to be included in the signal to be corrected; and the noise of the signal to be corrected is corrected by using the correction value of the noise shape thus generated.

According to a fifth aspect of the present invention, in a signal processing method for correcting a noise of a signal to be corrected, an estimated noise shape is calculated by estimating a noise shape of the signal to be corrected based on a calibration signal including a noise correlating with the noise of the signal to be corrected; information on an estimation error of the estimated noise shape is generated based on the estimated noise shape; a correction value of a noise shape is generated by modifying the estimated noise shape based on the information on the estimation error of the estimated noise shape; and a noise of a signal to be corrected is corrected by using the correction value of the noise shape.

According to a sixth aspect of the present invention, in the signal processing method according to any one of the third to fifth aspects, it is preferable that an average amplitude of a noise shape included correlatively in the signal to be corrected and the calibration signal and information on an estimation error of the estimated noise shape are generated based on a pseudo image to be corrected with a noise performance equal to the signal to be corrected and a pseudo calibration signal with a noise performance equal to the calibration signal.

According to a seventh aspect of the present invention, in the signal processing method according to any one of the first to sixth aspects, it is preferable that the estimated noise shape is separated into a high-frequency band and a low-frequency band, an amplitude of the estimated noise shape of the high-frequency band is attenuated, and the estimated noise shape of the high-frequency band with the attenuated amplitude and the estimated noise shape of the low-frequency band are combined to generate the correction value of the noise shape.

According to a eighth aspect of the present invention, in a signal processing method for correcting a noise of a signal to be corrected, a sum value is calculated by summing up signal values of a predetermined number of sum signals within a predetermined range of a calibration signal including a noise correlating with the signal to be corrected; a correction value of a noise shape smaller than an average value of the signal values within the predetermined range is calculated by dividing the sum value by a predetermined value larger than the predetermined number of sum signals; and the noise of the signal to be corrected is corrected by using the correction value of the noise shape.

According to a ninth aspect of the present invention, in the signal processing method according to any one of the first to eighth aspects, it is preferable that the noise is at least one of an offset noise and a gain noise.

According to a tenth aspect of the present invention, in a signal processing system for correcting a noise of an image to be corrected includes: a coefficient generating device; and a digital camera, wherein: the coefficient generating device includes: a coefficient calculating section that calculates a coefficient for attenuating an amplitude of an estimated noise shape estimated to be included in an image to be corrected that is imaged by the digital camera; and an output section that outputs the coefficient calculated by the coefficient calculating section to the digital camera, and the digital camera includes: a storing section that stores the coefficient input from the coefficient generating device; a calculating section that calculates an estimated noise shape estimated to be included in the image to be corrected based on a calibration image including a noise correlating with the noise of the image to be corrected; a generating section that generates a correction value of a noise shape by attenuating an amplitude of the estimated noise shape calculated with the calculating section by the coefficient stored in the storing section; and a noise correcting section that corrects the noise of the image to be corrected using the correction value of the noise shape generated with the generating section.

According to a eleventh aspect of the present invention, a coefficient generating device is to be used in the signal processing system according to the tenth aspect.

According to a twelfth aspect of the present invention, a digital camera is to be used in the signal processing system according to the tenth aspect.

DESCRIPTION OF PREFERRED EMBODIMENTS

First Embodiment

Figure 1:
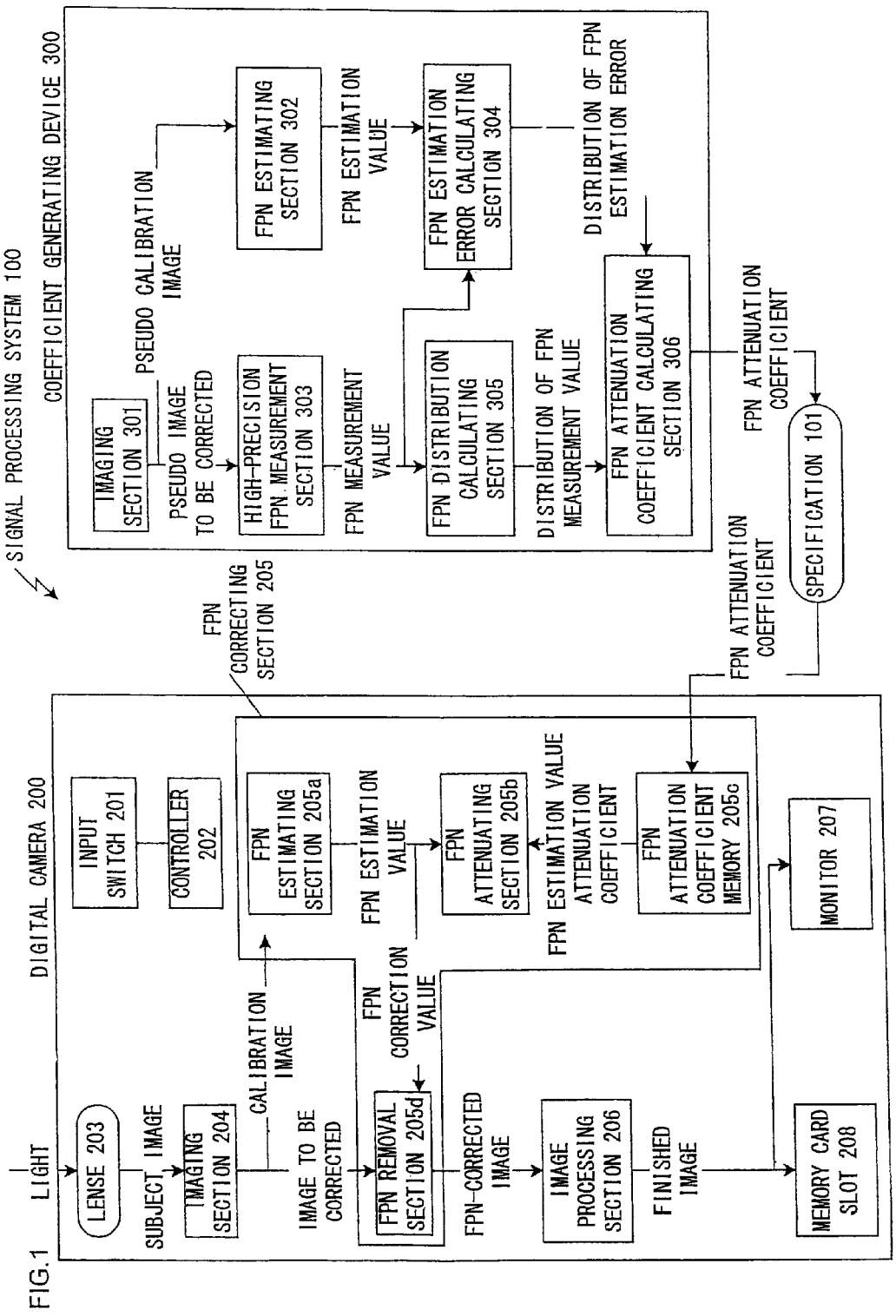
FIG. 1 is a block diagram that shows a configuration of an embodiment of a signal processing system.

FIG. 1 is a block diagram that shows a configuration of an embodiment of a signal processing system for performing a signal processing method in accordance with a first embodiment. A signal processing system 100 includes a digital camera 200 and a coefficient generating device 300.

The digital camera 200 includes an input switch 201, a controller 202, a lens 203, an imaging section 204, a FPN correcting section 205, an image processing section 206, a monitor 207, and a memory card slot 208. Functions of the FPN correcting section 205 and the image processing section 206 are realized by an ASIC circuit.

The input switch 201 is an assembly of input members for a user to operate the digital camera 200, and includes an operation button such as a release switch.

The controller 202 controls each component of the digital camera 200 in response to an input from the input switch 201. The imaging section 204, which is a CCD for example, outputs a calibration image imaged in a lightproof manner and an image to be corrected obtained by imaging a subject image formed through the lens 203 to the FPN correcting section 205, every time the user presses down the release switch included in the input switch 201.

The FPN correcting section 205 includes a FPN estimating section 205a, a FPN attenuating section 205b, a FPN attenuation coefficient memory 205c, and a FPN removal section 205d. The FPN estimating section 205a outputs a FPN estimation value based on the calibration image. The FPN attenuating section 205b attenuates the FPN estimation value and outputs a FPN correction value in accordance with a FPN attenuation coefficient read out from the FPN attenuation coefficient memory 205c. The FPN removal section 205d subtracts the FPN correction value which is output from the FPN attenuating section 205b from the image to be corrected, and outputs a FPN-corrected image to the image processing section 206. The FPN attenuation coefficient which is generated with the coefficient generating device 300 is stored in the FPN attenuation coefficient memory 205c in advance before shipping of the digital camera 200. FPN correction processing will be hereinafter described in detail.

The image processing section 206 performs a variety of known image processings including interpolation processing, color conversion processing, edge enhancement processing, etc. to the image with the FPN corrected by the FPN correcting section 205, and outputs a finished image. The monitor 207 displays a reduced image of the finished image. The memory card slot 208 stores the finished image in a memory card.

The coefficient generating device 300, which is a device for generating the FPN attenuation coefficient, includes an imaging section 301, a computer that a camera manufacturer owns, an image processing program that operates on the computer. The image processing program causes the computer to operate as a FPN estimating section 302, a high-precision FPN measurement section 303, a FPN estimation error calculating section 304, a FPN distribution calculating section 305, and a FPN attenuation coefficient calculating section 306. Descriptions for a hard disk drive, a monitor, etc. which are included in the computer are herein omitted.

The imaging section 301 is an image sensor which is the same type as the imaging section 204. The imaging section 301 has an equal noise performance to that the imaging section 204 has. The imaging section 301 images a pseudo calibration image and a pseudo image to be corrected in a lightproof manner. Image data thus obtained are stored in the hard disk drive of the computer through an interface such as USB. The image processing program is launched so that the noise performance of the image data is analyzed, and the FPN attenuation coefficient is generated. The generated FPN attenuation coefficient is included in a specification 101 as an image processing parameter of the model of the digital camera 200. The FPN attenuation coefficient included in the specification 101 is stored in the FPN attenuation coefficient memory 205c when parameters of image processing engine are set at manufacture of the digital camera 200. Processing for generating the FPN attenuation coefficient will hereinafter be described in detail.

Figure 2:
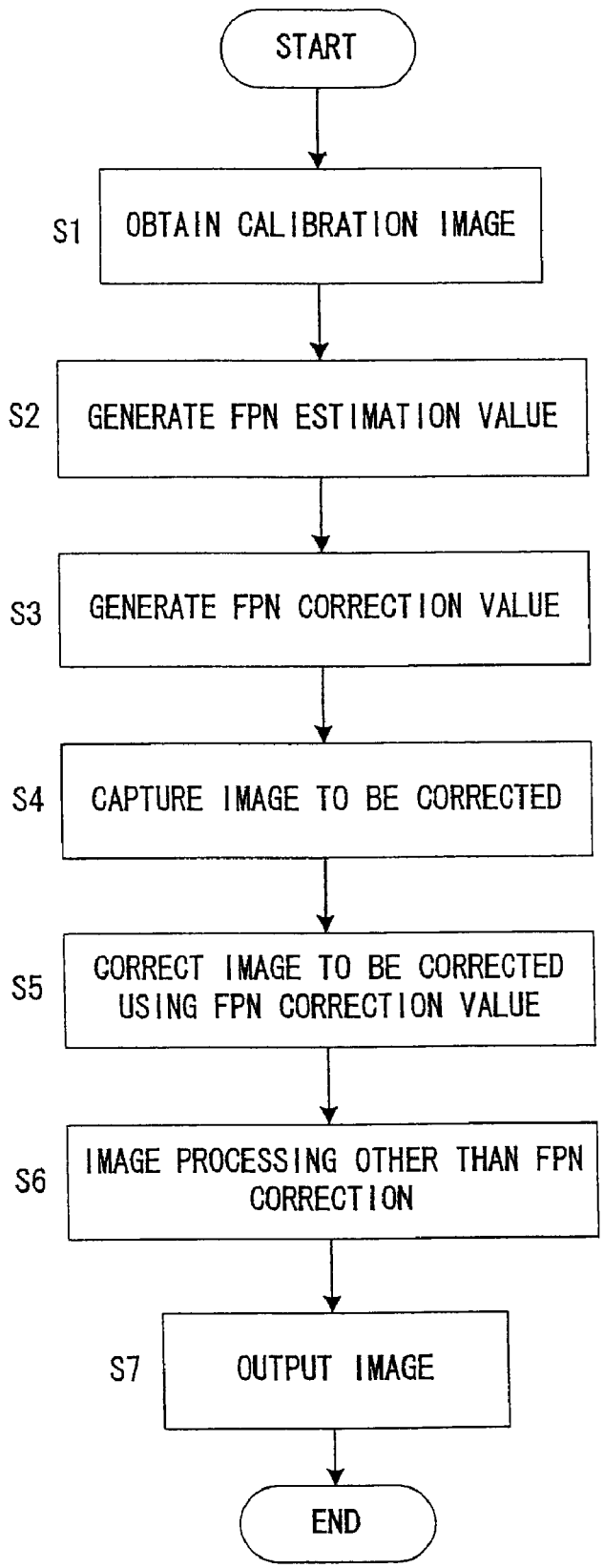
FIG. 2 is a flowchart that shows a processing procedure for a digital camera 200.

Processing for the offset vertical streak FPN correction is described in detail here with reference to FIGS. 1 and 2. FIG. 2 is a flowchart that shows a processing procedure for the digital camera 200. Once the release switch included in the input switch 201 is pressed down, the processing shown in FIG. 2 is started.

In step S1, the imaging section 204 is driven in a lightproof manner, images the calibration image, and outputs the calibration image to the FPN estimating section 205a. The calibration image includes the vertical streak FPN correlates with the image to be corrected which is to be imaged later. The vertical streak FPN is commonly generated in the pixels in the same vertical line.

In step S2, the FPN estimating section 205a calculates the FPN estimation value based on the calibration image. In this processing, an average of the pixel values of each vertical line of the calibration image for the number of the pixels L is assumed to be a FPN estimation value nl' of be the vertical line. The sufficient number of pixels L counterbalances noise other than the FPN in each vertical line, therefore a high-precision FPN estimation value nl' is obtained. The pixel values over a wide area of the calibration image needs to be read out for making the number of pixels L sufficient. This, however, causes the release time lag to increase, while the speed of continuous shooting to decrease. Therefore, the number of the pixels L is set to be, for example, 128 pixels. As a result, the FPN estimation value includes the FPN estimation error arising from noise other than the FPN.

In step S3, the FPN attenuating section 205b attenuates the FPN estimation value nl' and generates a FPN correction value nl". In this processing, a FPN attenuation coefficient k is read out from the FPN attenuation coefficient memory 205c. The FPN correction value nl" of each vertical line is calculated by the following equation (1).

$$nl'' = k \times nl' \quad (1)$$

The FPN attenuation coefficient k is generated by the coefficient generating device 300 and stored in the FPN attenuation coefficient memory 205c in advance before shipping of the digital camera 200. The value of the generated FPN attenuation coefficient k is usually 0.8 to 0.9. Processing for generating the FPN attenuation coefficient k will be described hereinafter.

In step S4, the imaging section 204 is driven on exposure, captures a subject image formed through the lens 203, and outputs the captured image as the image to be corrected.

In step S5, the FPN removal section 205d subtracts the FPN correction value nl" from the pixel values of each vertical line of the image to be corrected, and outputs the FPN-corrected image.

In step S6, the image processing section 206 performs known image processings including black level correction, Bayer interpolation, color conversion, edge enhancement, etc. to the FPN-corrected image, and outputs the finished image.

In step S7, the image processing section 206 displays a reduced image of the finished image on the monitor 207, and stores the finished image in the memory card inserted in the memory card slot 208.

The principle of the FPN correction in accordance with the present invention, advantages over conventional methods, and calculating method for the FPN attenuation coefficient k are described hereinbelow. The FPN estimation value nl' generated in step S2 is a value that the FPN estimation error ne is added to a true value nl of the FPN. The FPN estimation error ne is an average of noise other than the FPN for the number of the pixels L in each vertical line, which is expressed in the following equation (2).

$$nl' = nl + ne \quad (2)$$

In step S3, the FPN estimation value nl' is attenuated to generate the FPN correction value nl"=k×nl'. In step S5, the FPN correction value nl" is subtracted from each line of the image to be corrected. The vertical streak noise nl''' generated on the FPN-corrected image is given by the following equation (3).

$$nl''' = nl - k \times nl' = (1-k) \times nl - k \times ne \quad (3)$$

The equation (2) is used for transposition to the right side.

Here, the FPN estimation error ne is a value attributable to noise other than the FPN, and is a random variable uncorrelated with the FPN's true value nl. Variance $\sigma^2$ of nl''' is given by the following equation (4).

$$\sigma^2 = (1-k)^2 \times \sigma l^2 + k^2 \times \sigma e^2 \quad (4)$$

In the equation (4), $\sigma l^2$ is variance of the FPN's true value nl, and $\sigma e^2$ is variance of the FPN estimation error ne.

Attenuating the FPN estimation value is not included in conventional FPN correction processings: the variance $\sigma^2$ of the corrected vertical streak noise is obtained by the equation (4) with k=1, resulting in $\sigma^2 = \sigma e^2$. On the other hand, in the present invention, an appropriate setting of the FPN attenuation coefficient k enables better correction processing than the conventional ones. The optimal value for k, that is a value that minimizes $\sigma^2$ given by the equation (4), is given by the following equation (5). Its solution is given by the following equation (6).

$$\partial \sigma^2 / \partial k = 2(k-1)) \sigma_1^2 + 2k\sigma_e^2 = 0 \quad (5)$$

$$k = \sigma l^2 / (\sigma l^2 + \sigma e^2) \quad (6)$$

The variance $\sigma^2$ of the corrected vertical streak noise in accordance with the present invention is obtained by assigning the equation (6) to the equation (4), resulting in $\sigma^2 = k \times \sigma e^2$. Since the value of k is usually 0.8 to 0.9, $\sigma^2$ is improved by 10% to 20% compared to the conventional methods. In the present embodiment, circuits added to the conventional ones are only the FPN attenuating section 205b and the FPN attenuation coefficient memory 205c. Given the little increase in circuit size, the improvement in $\sigma^2$ is significant.

Described from another theoretical side, operational effect of the present invention is regarded as processing for modifying the FPN estimation value nl' based on information (expectation) for the FPN estimation error ne obtained according to the FPN estimation value nl'. In a description given hereinafter, offset processing with averages of nl' being 0 and of ne being 0 is assumed for the sake of simplicity. There is a correlation between the FPN estimation value nl' and the FPN estimation error ne, with its covariance given by the following equation (7).

$$<nl' \times ne> = <(nl+ne) \times ne> = <ne^2> = \sigma e^2 \quad (7)$$

Accordingly, information for the FPN estimation error ne can be added by calculating the FPN estimation value nl'. In other words, an expectation of ne before the FPN estimation value is calculated is 0, meanwhile, an expectation of ne with the FPN estimation value calculated to be nl' is not 0 but given by the following equation (8).

$$<ne> = nl' \times (\text{covariance of } nl' \text{ and } ne)/(\text{variance of } nl') \quad (8)$$

$$= nl' \times \sigma e^2 / (\sigma l^2 + \sigma e^2)$$

The FPN correction value nl" which is statistically closer to nl than nl' is given by subtracting <ne> from nl'=nl+ne, where nl" is given by the following equation (9) and coincides with FPN correction value nl", which is given by the equation (1) when k is given by the equation (6).

$$nl'' = nl' - nl' \times \sigma e^2 / (\sigma l^2 + \sigma e^2) \quad (9)$$
$$= nl' \times \sigma l^2 / (\sigma l^2 + \sigma e^2)$$

Figure 3:
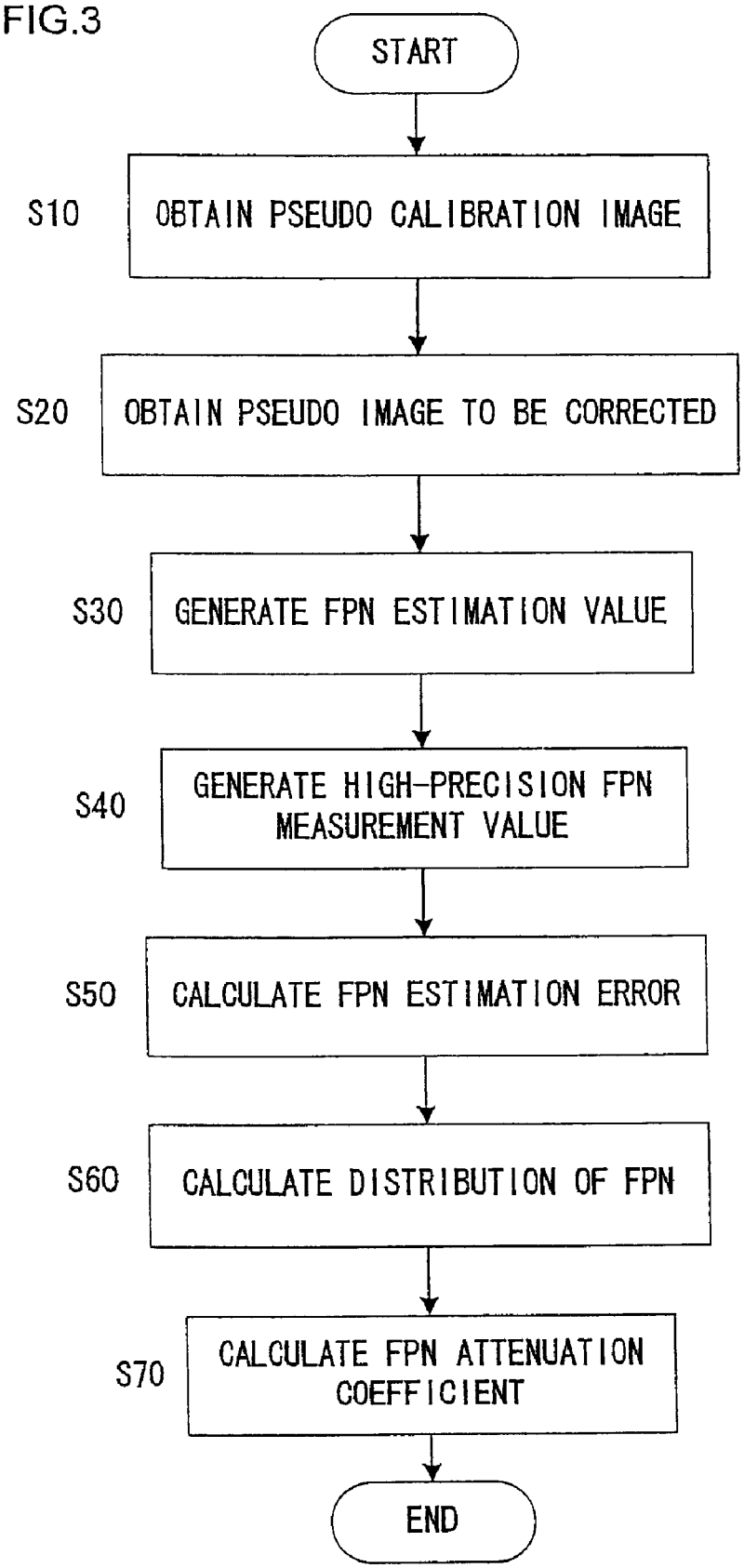
FIG. 3 is a flowchart that shows a procedure for coefficient generating processing.

According to the above, the appropriate FPN attenuation coefficient k is given by assigning the variance $\sigma l^2$ of the FPN's true value nl and the variance $\sigma e^2$ of the FPN estimation error to the equation (6). These processings are performed by the coefficient generating device 300. Actual operations by the coefficient generating device 300 are hereinafter described with reference to FIGS. 1 and 3. FIG. 3 is a flowchart that shows the procedure for coefficient generating processing. The processing detail is as follows.

In step S10, the imaging section 301 is driven in a light-proof manner and generates the pseudo calibration image. The imaging section 301, which is the same type as the imaging section 204, has the equal noise performance to that the imaging section 204 has. Therefore, both the average amplitude of the FPN and the average amplitude of noise other than the FPN are equal between the images by the imaging section 301 and those by the imaging section 204. However, the shapes of those FPNs are different between them.

In step S20, the imaging section 301 is driven in a light-proof manner and generates the pseudo image to be corrected. As described above, since the imaging section 301 is the same type as the imaging section 204, the average amplitude of the FPN included in the pseudo image to be corrected which is imaged by the imaging section 301 is equal to that in the image to be corrected which is imaged by the imaging section 204. However, the shapes of the FPNs are different from each other.

In step S30, the FPN estimating section 302 calculates the FPN estimation value based on the pseudo calibration image. This processing is carried out by simulating processing of the FPN estimating section 205a. That is, the FPN estimation value nl' is calculated by averaging the pixel values for the number of the pixels L which is same as that used in the FPN estimating section 205a in each area of vertical line of the pseudo calibration image. The FPN estimation error which is included in the FPN estimation value nl' calculated by the FPN estimating section 302 is the same size as that by the FPN estimating section 205a.

In step S40, the high-precision FPN measurement section 303 precisely measures the FPN included in the pseudo image to be corrected. This processing averages the pixel values for the sufficient number of the pixels (2048 pixels for example) in each vertical line of the pseudo image to be corrected. This processing counterbalances noise other than the FPN in each vertical line and makes it substantially 0 so that the FPN measurement value which is substantially equal to the FPN's true value nl is calculated. The FPN measurement value thus calculated is denoted by nl.

In step S50, the FPN estimation error calculating section 304 calculates the FPN estimation error ne by the following equation (10), according to the FPN estimation value nl' and the FPN measurement value nl.

$$ne = nl' - nl \quad (10)$$

The FPN estimation error ne is calculated for each vertical line, and then the variance $\sigma e^2$ of the FPN estimation errors ne is calculated.

In step S60, the FPN distribution calculating section 305 calculates the variance $\sigma l^2$ of the FPN measurement values nl.

In step S70, the FPN attenuation coefficient calculating section 306 calculates the FPN attenuation coefficient k by the equation (6), according to the variance $\sigma l^2$ of the FPN measurement values and the variance $\sigma e^2$ of the FPN estimation errors. The calculated FPN attenuation coefficient k is included in the specification 101 and stored in the FPN attenuation coefficient memory 205c after the digital camera 200 is manufactured.

The above processing enables the FPN attenuation coefficient k appropriate for the FPN correction processing of the digital camera 200 to be stored in the FPN attenuation coefficient memory 205c, and the FPN in images which are imaged using the digital camera 200 to be precisely corrected.

In accordance with the first embodiment, the FPN correction processing using the FPN correction value generated by attenuating the FPN estimation value enables the vertical streak noise after the correction to be reduced by 10% to 20% compared to the conventional methods. Processing that the present invention adds to the conventional methods is only to attenuate the FPN estimation value. Given the little increase in circuit size, this improvement is significant.

Second Embodiment

In the FPN correction in accordance with the first embodiment, the circuit size is slightly increased compared to the conventional methods. In the second embodiment, the increase in the circuit size is prevented. The method for improving the FPN correction accuracy without increasing the circuit size compared to the conventional methods is described.

A digital camera in accordance with the present embodiment is the digital camera 200 in FIG. 1 with a circuit includes the FPN estimating section 205a, the FPN attenuating section 205b, and the FPN attenuation coefficient memory 205c replaced with a FPN correction value calculating section 205e to be described below. Other performances of the digital camera 200 than the above is the same as those in the first embodiment.

The FPN correction value calculating section 205e sums the pixel values in each vertical line of the calibration image for the sum number of the pixels L. The sum value is divided by L', which is a value larger than the L, and is output as the FPN correction value. The L and L' are set so that k=L/L' is close enough to an optimal FPN attenuation coefficient k_best which the coefficient generating device 300 outputs. When k_best is 0.8 to 0.9, for example, L may be set to 112 and L' may be set to 128.

The FPN correction value calculating section 205e brings a processing result which is equal to that brought from a processing below in accordance with the first embodiment. It is equal to the following processing in the FPN estimating section 205a: calculating an average for the number of pixels L=112 in each vertical line of the calibration image as a FPN estimation value; multiplying the FPN estimation value by the FPN attenuation coefficient k=0.875; and outputting the result, that is, the FPN correction value. The second embodiment is realized with the circuit size equal to the conventional FPN correction processings, because the conventional FPN correction processings correspond to the processing where L=L' in the present embodiment.

In accordance with the present embodiment, k often fails to correspond exactly to the optimal FPN attenuation coefficient k_best which the coefficient generating device 300 outputs, because of difficulty in setting the value of k=L/L' freely. Still, however, high-precision FPN correction processing is performable in accordance with the present embodiment compared to the conventional methods. This will be described below.

According to the equation (4), setting the FPN attenuation coefficient k to be within a range of the following equation (11) makes the corrected variance $\sigma^2$ smaller than the conventional corrected variance $\sigma e^2$.

$$2 \times k\_best - 1 \leq k \leq 1 \quad (11)$$

where $k\_best = \sigma l^2/(\sigma l^2 + \sigma e^2)$.

Consequently, when k is set to a given value, if k_best is within a range of the following equation (12), the FPN correction accuracy in the present embodiment is improved compared to the conventional ones.

$$k\_best < (k+1)/2 \quad (12)$$

When k=0.875 in the present embodiment, for example, the FPN correction accuracy is improved compared to the conventional ones, for a combination of the imaging section and the FPN estimating section with k_best<0.9375. In most cases, since k_best is about 0.8 to 0.9, an enough improvement effect is achieved by setting k=0.875.

In accordance with the second embodiment, the pixel values in each vertical line of the calibration image for the sum number of the pixels L are summed, and the sum value is divided by a value larger than the sum number of the pixels L to calculate the FPN correction value. This configuration keeps the same circuit size with the conventional ones and improves the FPN correction accuracy compared to the conventional ones.

Third Embodiment

In accordance with the first or second embodiment, an appropriate FPN correction processing is performed for most of image sensors. However, since some of the image sensors generate a high FPN in low-frequency components, making the FPN correction in accordance with the first embodiment to images that are imaged by such image sensors slightly reduces the FPN correction effects to the low-frequency components compared to the conventional methods. In the third embodiment, a FPN correction method with the above defect improved will be described.

Figure 4:
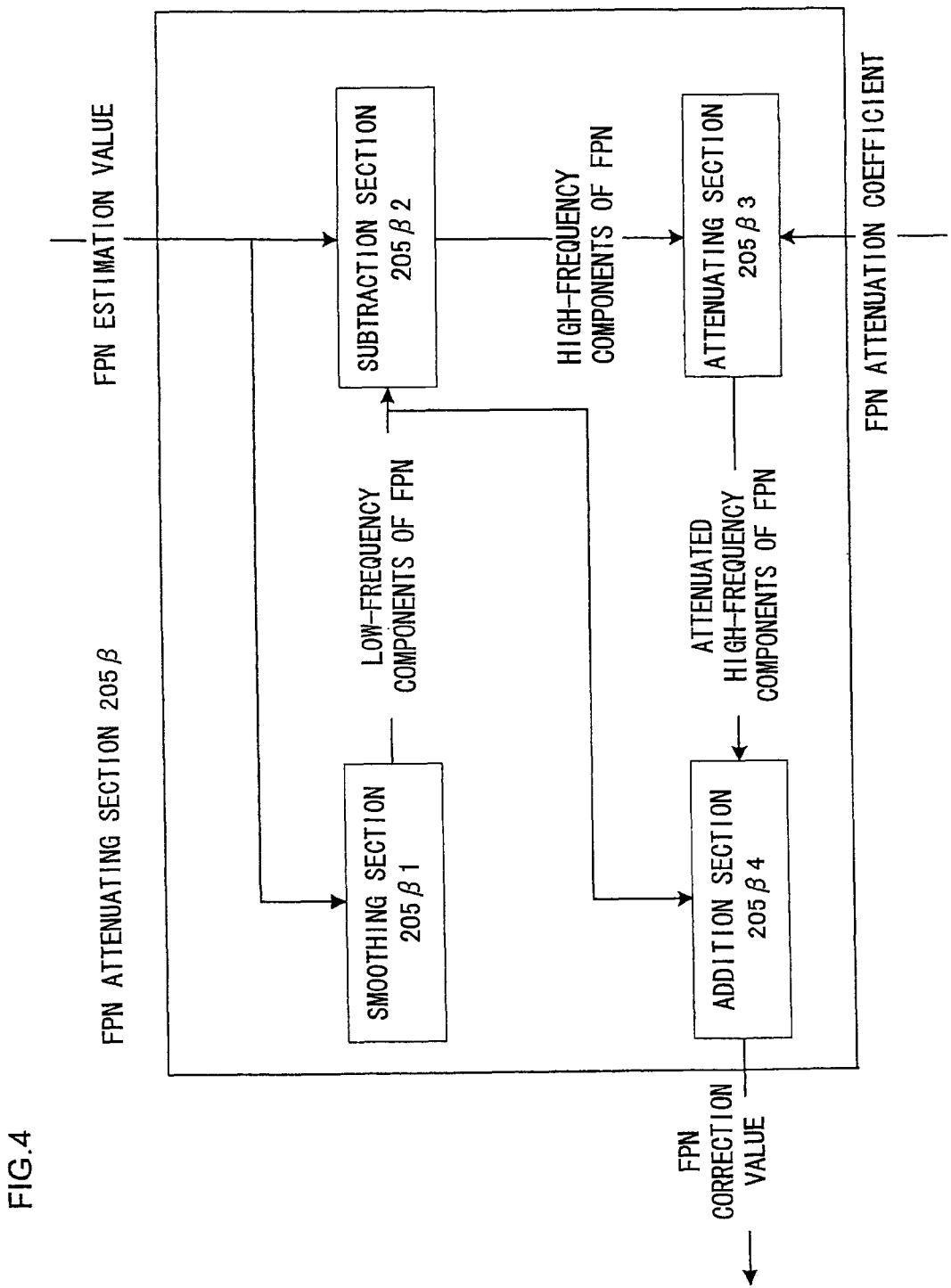
FIG. 4 is a block diagram that shows a configuration of a FPN attenuating section 205P in accordance with a third embodiment.

A device in accordance with the present embodiment is the digital camera 200 in FIG. 1 with the FPN attenuating section 205*b* replaced with a FPN attenuating section 205β in FIG. 4. Other performances of the digital camera 200 than the FPN attenuating section 205*b* is the same as those in the first embodiment. Hereinafter, the performance of the FPN attenuating section 205β will be described with reference to FIG. 4.

The FPN estimation values are calculated for each vertical line of the calibration image. A smoothing section 205β1 applies, for example, a Gaussian smoothing filter of width 7 to data that the FPN estimation values are aligned along the abscissa, and extracts the FPN's low-frequency components. Weighted coefficients of the above filtering are, for example, (1/64, 6/64, 15/64, 20/64, 15/64, 6/64, 1/64).

A subtraction section 205β2 extracts the FPN's high-frequency components by subtracting the FPN's low-frequency components from the pre-smoothing FPN estimation value. An attenuating section 205β3 reads the FPN attenuation coefficient k and multiplies the FPN's high-frequency components by the FPN attenuation coefficient k, to calculate the attenuated FPN's high-frequency components. An addition section 205β4 adds the FPN's low-frequency components calculated by the smoothing section 205β1 and the attenuated FPN's high-frequency components calculated by the attenuating section 205β3 to obtain the FPN correction value.

In accordance with the third embodiment, only the high-frequency components of the FPN estimation value is attenuated, while the low-frequency components of the FPN estimation value is not attenuated, to generate the FPN correction value. Therefore, for images including the strong FPN in the low-frequency components, the FPN correction accuracy to the high-frequency components is improved compared to the conventional ones, with the FPN correction accuracy to the low-frequency components kept the same as the conventional ones.

Fourth Embodiment

The offset FPN correction is described in the first to the third embodiments. The present invention is not limited to the offset FPN correction but is also applicable to a gain FPN correction. Actual processing in which the present invention is applied to the gain FPN correction of the digital camera is described in the fourth embodiment. The signal processing system in accordance with the present embodiment is, like the one in the first embodiment, realized by the configuration in FIG. 1 and the processing procedures in FIGS. 2 and 3. However, each processing content is different from those in the first embodiment. Specific performances of the digital camera 200 will be described with reference to FIGS. 1 and 2.

In FIG. 2, in step S1, a user of the digital camera 200 operates the input switch 201 to set a shooting mode of the digital camera 200 to "calibration image shooting mode." When the user points the digital camera 200 at a homogeneous achromatic wall or the sky and presses the release switch down, the controller 202 controls the aperture of the lens 203 for setting the aperture at F (for example, F5.6) to avoid vignetting. The controller 202 further controls the focus of the lens 203 for setting the focus so that the subject is imaged out of focus in response to output from an automatic focusing device which is not figured herein.

A photometric instrument which is not herein figured meters luminance of the wall or the sky. The controller 202 sets an exposure time so that the imaging section 204 is exposed with a predetermined exposure amount according to results of the photometry. The imaging section 204 is exposed with the above lens settings and the exposure time, captures the calibration image, and outputs the calibration image thus captured to the FPN estimating section 205*a*. The calibration image includes the vertical streak FPN which correlates with the image to be corrected which is to be imaged later. The vertical streak FPN is commonly generated in the pixels in the same vertical line.

In step S2, the FPN estimating section 205*a* calculates the FPN estimation value based on the calibration image. In this processing, an "average of vertical lines" is calculated by averaging the pixel values of each vertical line of the calibration image for the predetermined number of pixels. Then, an "average of vertical lines with the high-frequency FPN removed" is generated by applying, for example, the Gaussian smoothing filter of width 7 to the "average of vertical lines" aligned along the abscissa. For each vertical line, the "average of vertical lines" divided by the "average of vertical lines with the high-frequency FPN removed" is calculated as the FPN estimation value nl'. The FPN estimation value nl' includes the FPN estimation error that arises from noise other than the FPN.

In step S3, the FPN attenuating section 205b attenuates the FPN estimation value nl' and generates the FPN correction value nl". In this processing, the FPN attenuation coefficient k is read from the FPN attenuation coefficient memory 205c. The FPN correction value nl" of each vertical line is calculated by the following equation (13).

$$nl'' = nl'^k \quad (13)$$

The FPN attenuation coefficient k is generated by the coefficient generating device 300 and stored in the FPN attenuation coefficient memory 205c in advance before shipping of the digital camera 200. Processing for generating the FPN attenuation coefficient k will be described hereinafter.

In step S4, the user of the digital camera 200 operates the input switch 201 to set a shooting mode of the digital camera 200 to "normal shooting mode." When the user points the digital camera 200 at a subject and presses the release switch down, the imaging section 204 is driven on exposure, captures the subject image formed through the lens 203, and outputs the captured image as the image to be corrected.

In step S5, the FPN removal section 205b divides the pixel values of each vertical line of the image to be corrected by the FPN correction value nl" and outputs the FPN-corrected image.

In step S6, the image processing section 206 performs known image processings including the black level correction, the Bayer interpolation, the color conversion, the edge enhancement, etc. to the FPN-corrected image, and outputs the finished image.

In step S7, the image processing section 206 displays a reduced image of the finished image on the monitor 207, and stores the finished image in the memory card inserted in the memory card slot 208.

The principle of the FPN correction in accordance with the present invention, advantages over those methods without attenuating the FPN, and calculating method for the FPN attenuation coefficient k are described hereinbelow. The FPN estimation value nl' generated in step S2 is a value that the FPN's true value nl is multiplied by the FPN estimation error ne, which is expressed in the following equation (14).

$$nl' = nl \times ne \quad (14)$$

In step S3, the FPN estimation value nl" is attenuated to generate the FPN correction value nl"=nl'$^k$. In step S5, the pixel values of each line of the image to be corrected are divided by the FPN correction value nl". The vertical streak noise nl''' generated on the FPN-corrected image is given by the following equation (15).

$$nl''' = nl/nl'^k = nl^{1-k}/ne^k \quad (15)$$

The equation (14) is used for transposition to the right side.

The equation (15) is logarithmically represented as the following equation (16).

$$\log(nl''') = (1-k) \times \log(nl) - k \times \log(ne) \quad (16)$$

Here, log(ne) is a value that arises from noise other than the FPN, and is a random variable uncorrelated with log(nl) Variance $\sigma^2$ of log(nl''') is given by the following equation (17).

$$\sigma^2 = (1-k)^2 \times \sigma l^2 + k^2 \times \sigma e^2 \quad (17)$$

Here, $\sigma l^2$ is variance of log(nl), and $\sigma e^2$ is variance of log(ne).

The variance $\sigma^2$ of the logarithm of the corrected vertical streak noise without attenuating the FPN estimation value is obtained by the equation (17) with k=1, resulting in $\sigma^2 = \sigma e^2$.

On the other hand, in the present invention, an appropriate setting of the FPN attenuation coefficient k enables better correction processing than the conventional ones. The optimal value for k, which is a value that minimizes $\sigma^2$ given with the equation (17), is given by the following equation (18). Its solution is given by the following equation (19).

$$\partial \sigma^2 / \partial k = 2(k-1)\sigma l^2 + 2k\sigma e^2 = 0 \quad (18)$$

$$k = \sigma l^2 / (\sigma l^2 + \sigma e^2) \quad (19)$$

The variance $\sigma^2$ of the logarithm of the corrected vertical streak noise in accordance with the present invention is obtained by assigning the equation (19) to the equation (17), resulting in $\sigma^2 = k \times \sigma e^2$. Since k is a coefficient less than 1, $\sigma^2$ is improved compared to the correction without attenuating the FPN estimation value.

According to the above, the appropriate FPN attenuation coefficient k for the present embodiment is given by assigning the variance $\sigma l^2$ of the logarithm log(nl) of the FPN's true value and the variance $\sigma e^2$ of the logarithm log(ne) of the FPN estimation error to the equation (19). These processings are performed by the coefficient generating device 300. Operations by the coefficient generating device 300 are hereinafter described with reference to FIGS. 1 and 3. FIG. 3 is the flowchart that shows the procedure for coefficient generating processing. The processing detail is as follows.

In step S10, an engineer of the camera manufacturer homogeneously illuminates the imaging section 301 using a lighting equipment which is not figured herein. The imaging section 301 is driven with the illumination and images the pseudo calibration image. Exposure conditions are set so that the exposure amount for the imaging equal to that for the imaging in the "calibration image shooting mode" of the digital camera 200. The imaging section 301 is the same type as the imaging section 204 and has the equal noise performance to that the imaging section 204 has. Since the imaging section 301 images the pseudo calibration image with almost same exposure amount as that in the "calibration image shooting mode" of the digital camera 200, both the average amplitude of the FPN and the average amplitude of noise other than the FPN in the pseudo calibration image are equal to that in the "calibration image shooting mode" of the digital camera 200. However, the shapes of the FPNs are different between them.

In step S20, a plurality of pseudo images to be corrected (for example, 64 images) are imaged in the same processing as that in step S10.

In step S30, the FPN estimating section 302 calculates the FPN estimation value based on the pseudo calibration image. This processing is carried out by simulating processing of the FPN estimating section 205a. The FPN estimation error which is included in the FPN estimation value nl' calculated by the FPN estimating section 302 is the same size as that by the FPN estimating section 205a.

In step S40, the high-precision FPN measurement section 303 precisely measures the FPN of the imaging section 301. This processing creates an average picture of the plurality of pseudo images to be corrected (for example, 64 images) imaged in step S20. This averaging process counterbalances most of the noise other than the FPN. The FPN measurement value is obtained by performing the same processing as that in step S30 to the average picture. Since the average picture does not include noise other than the FPN, the FPN measurement value does not include the FPN estimation error. The FPN measurement value is thus denoted by nl.

In step S50, the FPN estimation error calculating section 304 calculates the logarithm of the FPN estimation error ne log(ne) by the following equation (20), based on the FPN estimation value nl' and the FPN measurement value nl.

$$\log(ne) = \log(nl') - \log(nl) \quad (20)$$

The logarithm of the FPN estimation error log(ne) is calculated for each vertical line, and then the variance $\sigma e^2$ of log(ne) is calculated.

In step S60, the FPN distribution calculating section 305 calculates the variance $\sigma l^2$ of the logarithms of the FPN measurement value log(nl).

In step S70, the FPN attenuation coefficient calculating section 306 calculates the FPN attenuation coefficient k by the equation (19), according to the variance $\sigma l^2$ of the logarithms of the FPN measurement value and the variance $\sigma e^2$ of the logarithms of the FPN estimation error. The calculated FPN attenuation coefficient k is included in the specification 101 and stored in the FPN attenuation coefficient memory 205c after the digital camera 200 is manufactured.

The above processing enables the FPN attenuation coefficient k appropriate for the FPN correction processing of the digital camera 200 to be stored in the FPN attenuation coefficient memory 205c, and the FPN in images which are imaged using the digital camera 200 to be precisely corrected.

When the gain FPN is estimated using the calibration image, a lot of calibration images usually have to be imaged and averaged to reduce the FPN estimation error. However, imaging a lot of calibration images is undesirable because it is a burden on the user. It is preferable to estimate the FPN easily from a single or small number of calibration image(s). In accordance with the present embodiment, negative effects resulted from the FPN estimation error generated at the time are reduced, and a high-precision gain FPN correction processing is performed.

—Modifications—

The signal processing system in the above embodiments is modifiable as follows.

(1) In the first embodiment, processing for a case where the FPN generates as white noise is described. Actual FPN, however, may include more of low-frequency noise components. In that case, processing for removing the low-frequency noise components of the FPN estimation value and the FPN measurement value with the coefficient generating device 300 has to be added to the above embodiment. The processing is performed as follows. The low-frequency components are extracted by applying, for example, the Gaussian smoothing filter of width 7 to the FPN estimation values aligned along the abscissa that the FPN estimating section 302 calculates for each vertical line. Here, weighted coefficients of the filtering are, for example, (1/64, 6/64, 15/64, 20/64, 15/64, 6/64, 1/64). The above-described low-frequency components are subtracted from the aligned pre-smoothing FPN estimation values.

Low-frequency components are removed similarly for the FPN measurement value. Other processings are performed as in the case where low-frequency noise components are not included so much in the FPN.

(2) In the first to the third embodiments, the imaging section 204 images separately an image to be corrected and a calibration image. The invention is not to be limited by the described embodiments. The FPN estimation value may be calculated using OB area, which is an imaging area provided in a lightproof manner at the upper or lower edge of an image to be corrected, as a calibration image, because the OB area includes common vertical streak FPN with the one included in exposure area.

(3) In the first to the fourth embodiments, the imaging section 301 images separately a pseudo image to be corrected and a pseudo calibration image. However, since the noise performances of both images are substantially equal, an identical image may be used as the pseudo image to be corrected and as the pseudo calibration image.

(4) In the first to the fourth embodiments, the coefficient generating device 300 performs the FPN attenuation coefficient generation processing only once. The invention is not to be limited by the described embodiments. The FPN attenuation coefficient may be precisely calculated by performing the FPN attenuation coefficient generation processing more than once and calculating an average value of the plurality of the generated FPN attenuation coefficients.

(5) In the first to the third embodiments, the offset FPN correction processing is described. In the fourth embodiment, the gain FPN correction processing is described. In other words, processings for correcting either the offset FPN or the gain FPN are described. The invention is not to be limited by the described embodiments. The offset FPN correction and the gain FPN correction may be combined. For example, the gain FPN correction processing, which is described in the fourth embodiment, may be performed after the offset FPN correction processing, which is described in the first, the second, or the third embodiment, is performed. This enables each the offset FPN and the gain FPN to be corrected.

(6) A characteristic feature of the present invention is to attenuate the noise shape estimated based on the calibration signal and to use the same for correction processing. The following is an example of processings that utilize the characteristic feature of the present invention other than those in the above embodiments.

Conventionally, as a method for correcting dark current noise on long exposure, a calibration image which is imaged in a lightproof manner is subtracted from an image to be corrected which is imaged on exposure. The present invention is applicable to such correction method so that subtracting the attenuated calibration image from the image to be corrected enables dark current noise on long exposure to be corrected more precisely than in the conventional method.

Conventionally, headphones that produce music without noise by cancelling ambient noise have been developed. Such headphones obtain information on the ambient noise and send cancellation sound signals that cancel noise signals included in sound signals which reach a user'sears. The present invention is applicable to the above headphones so that attenuating the above cancellation sound signals enables noise to be cancelled more precisely than the conventional headphones.

In accordance with the above-described embodiments of the present invention, the amplitude of an estimated noise shape estimated according to a calibration image is attenuated to calculate a correction value of the noise shape, and the calculated correction value of the noise shape is used for correcting the noise in an image to be corrected. Thus, even if the estimated noise shape includes an error, influence of the error is reduced to correct the noise in the image to be corrected.

While the invention has been particularly shown and described with reference to preferred embodiments thereof, it will be understood by those skilled in the art that the foregoing and other changes in form and details can be made therein without departing from the scope of the invention.

What is claimed is:

1. A signal processing method for correcting a noise of a signal to be corrected, comprising:
   calculating an estimated noise shape estimated to be included in the signal to be corrected based on a calibration signal including a noise correlating with the noise of the signal to be corrected;
   calculating a correction value of a noise shape by multiplying the estimated noise shape by a coefficient which is smaller than 1; and correcting the noise of the signal to be corrected by subtracting the correction value of the noise shape thus generated from the signal to be corrected.

2. A signal processing method according to claim 1, wherein:
the estimated noise shape is calculated by calculating an average value of signal values within a predetermined range of the calibration signal.

3. A signal processing method according to claim 2, wherein:
the coefficient is calculated based on an average amplitude of a noise shape included correlatively in the signal to be corrected and the calibration signal, and information on an estimated error of the estimated noise shape.

4. A signal processing method according to claim 1, wherein:
the coefficient is calculated based on an average amplitude of a noise shape included correlatively in the signal to be corrected and the calibration signal, and information on an estimated error of the estimated noise shape.

5. A signal processing method according to claim 4, wherein:
an average amplitude of a noise shape included correlatively in the signal to be corrected and the calibration signal and information on an estimation error of the estimated noise shape are generated based on a pseudo image to be corrected with a noise performance equal to the signal to be corrected and a pseudo calibration signal with a noise performance equal to the calibration signal.

6. A signal processing method according to claim 1, wherein:
the estimated noise shape is separated into a high-frequency band and a low-frequency band, an amplitude of the estimated noise shape of the high-frequency band is attenuated, and the estimated noise shape of the high-frequency band with the attenuated amplitude and the estimated noise shape of the low-frequency band are combined to generate the correction value of the noise shape.

7. A signal processing method according to claim 1, wherein:
the noise is at least one of an offset noise and a gain noise.

8. A signal processing method according to claim 1, wherein
the calibration signal is obtained together with the signal to be corrected.

9. A signal processing system for correcting a noise of an image to be corrected, comprising:
a coefficient generating device; and
a digital camera, wherein:
the coefficient generating device comprises:
a coefficient calculating section that calculates a coefficient, which is smaller than 1, for attenuating an amplitude of an estimated noise shape estimated to be included in an image to be corrected that is imaged by the digital camera; and
an output section that outputs the coefficient calculated by the coefficient calculating section to the digital camera, and
the digital camera comprises:
a storing section that stores the coefficient input from the coefficient generating device;
a calculating section that calculates an estimated noise shape estimated to be included in the image to be corrected based on a calibration image including a noise correlating with the noise of the image to be corrected;
a generating section that generates a correction value of a noise shape by multiplying an amplitude of the estimated noise shape calculated with the calculating section by the coefficient stored in the storing section; and
a noise correcting section that corrects the noise of the image to be corrected by subtracting the correction value of the noise shape generated with the generating section from the image to be corrected.

10. A coefficient generating device to be used in the signal processing system according to claim 9.

11. A digital camera to be used in the signal processing system according to claim 9.

12. A signal processing system according to claim 9, wherein
the calibration image is obtained together with the image to be corrected.

13. A signal processing method for correcting a noise of a signal to be corrected, comprising:
calculating an estimated noise shape estimated to be included in the signal to be corrected based on a calibration signal including a noise correlating with the noise of the signal to be corrected;
generating a correction value of a noise shape by attenuating an amplitude of the estimated noise shape; and
correcting the noise of the signal to be corrected by using the correction value of the noise shape thus generated, wherein:
the amplitude of the estimated noise shape is attenuated based on an average amplitude of a noise shape included correlatively in the signal to be corrected and the calibration signal, and information on an estimated error of the estimated noise shape; and
an average amplitude of a noise shape included correlatively in the signal to be corrected and the calibration signal and information on an estimation error of the estimated noise shape are generated based on a pseudo image to be corrected with a noise performance equal to the signal to be corrected and a pseudo calibration signal with a noise performance equal to the calibration signal.

* * * * *